UNITED STATES PATENT OFFICE.

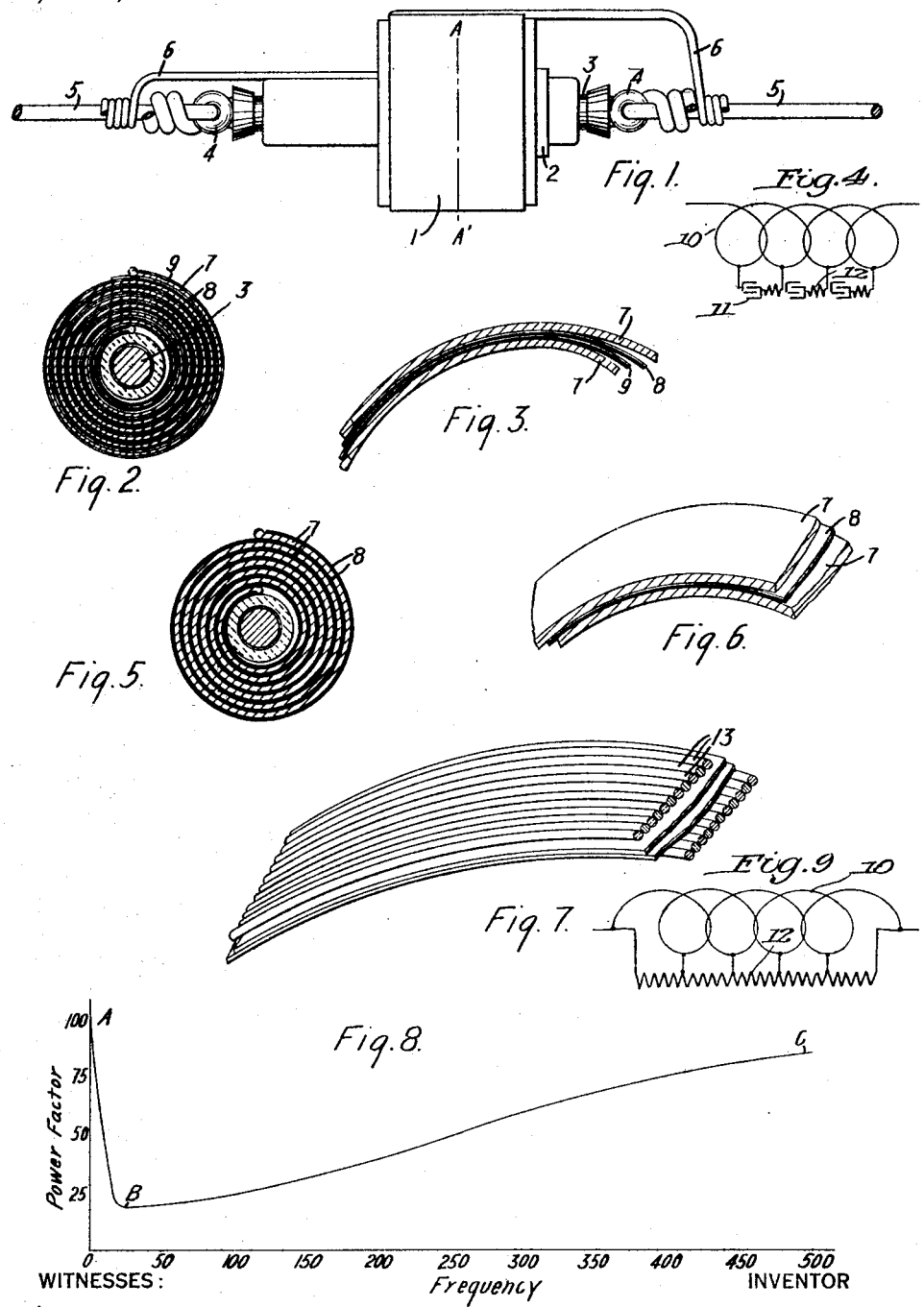

RAY P. JACKSON, OF EDGEWOOD, PENNSYLVANIA, ASSIGNOR TO WESTINGHOUSE ELECTRIC AND MANUFACTURING COMPANY, A CORPORATION OF PENNSYLVANIA.

STATIC PROTECTIVE DEVICE.

1,217,453.     Specification of Letters Patent.     Patented Feb. 27, 1917.

Application filed January 10, 1916. Serial No. 71,191.

*To all whom it may concern:*

Be it known that I, RAY P. JACKSON, a citizen of the United States, and a resident of Edgewood, in the county of Allegheny and State of Pennsylvania, have invented a new and useful Improvement in Static Protective Devices, of which the following is a specification.

My invention relates to devices for protecting electrical circuits and electrical apparatus associated therewith from impulses as are occasioned by lightning discharges, static disturbances and the like.

More particularly, my invention relates to lightning arresters that are directly inserted in the transmission line conductors and are devoid of ground connections or discharge paths to ground, thereby eliminating the danger arising from the flow of dynamo or power currents which tend to follow in the paths initially established by the discharge to ground of the high-frequency or high-potential impulses.

For protecting transmission lines operating at high voltages, it is desirable to employ protective devices for absorbing the energy of lightning discharges, static disturbances and the like, which are devoid of ground connections, because ground connections impair the insulating properties of the transmission conductors. Moreover, danger to the electrical circuits and the associated apparatus frequently arises through ground connections because of the occurrence of arcing grounds having critical frequencies and the tendency of the power or dynamo currents to follow in the paths to ground that are initially established by the discharges of high-frequency impulses.

It has been proposed to employ energy-absorbing devices which are directly connected in circuit with the transmission line conductors, such devices comprising choke coils which permit line currents of normal frequency to pass therethrough unimpeded and resistors connected in shunt to the choke coils to absorb the energy of the high-frequency impulses which are directed therethrough by reason of the inductive impedance presented to the high-frequency impulses by the choke coils. It is to this latter class of protective devices that my present invention is directed.

For a better understanding of the nature and scope of my invention, reference may be had to the following description and the accompanying drawing in which Figure 1 is a view, in side elevation, of a protective device constructed in accordance with my invention and connected in circuit with a transmission line conductor; Fig. 2 is a cross-sectional view taken along the line A A' of the coil of Fig. 1; Fig. 3 is an enlarged sectional view of a portion of the coil shown in Fig. 2; Fig. 4 is a diagrammatic view showing an electrical equivalent of the coil of Fig. 1; Fig. 5 is a view, similar to Fig. 2, of a modified structure; Fig. 6 is a sectional perspective view of a portion of the coil shown in Fig. 5; Fig. 7 is a perspective view of a portion of a choke coil of a modified structure, Fig. 8 is a graph showing the relationship existing between the power-factor of one of my protective devices and the frequency of the electrical impulses impressed upon the terminals thereof and Fig. 9 is a diagram showing an electrical equivalent of a modified form of my protective device.

Referring to Fig. 1, a protective device 1 comprising a current-carrying winding, a form of which will be hereinafter described, is mounted upon an insulating sleeve 2 which surrounds a strain insulator 3. Eyelets 4, at opposite ends of the strain insulator 3, provide means for mechanically supporting the device 1 by a transmission line conductor 5. Mechanical tension existing between the several sections of the conductor 5 by reason of the insertion of my protective device is assumed by the strain insulator 3, thus relieving the choke-coil 1 of all mechanical strains. Terminals 6 are employed to electrically connect the choke coil 1 in series-circuit relationship with the two portions of the transmission conductor 5.

In Figs. 2 and 3, I have shown more specifically the structure of a form of the protective device 1. In this instance a copper strap 7 of relatively large width is wound in the form of a spiral and constitutes the current-carrying medium of the protective device. Between adjacent layers or convolutions 7 of the current-carrying winding, I insert layers 8 of insulating material of high specific inductive capacity which may be made from paper or cloth impregnated with a suitable insulating compound or varnish, such as bakelite. Similarly, layers 9, consisting of a material such, for example, as asbestos cloth, having a relatively low specific electrical conductivity with respect to that of the layers 8, are positioned between the adjacent convolutions 7 and 8.

By referring to Fig. 3, the mode of construction of the device of Fig. 2 is more clearly illustrated, the two conducting layers 7 being separated from each other by means of the layer 8 which constitutes an insulating layer and the layer 9 which is equivalent to a high-resistance element. A satisfactory method of constructing a choke coil of my invention is to superpose upon one another three strips of adequate width, one strip constituting the current-carrying layer 7, another strip constituting the insulating element 8 and another strip constituting the resistance element 9 and simultaneously winding said three strips or layers in a spiral formation to form a structure similar to that shown in Fig. 2. Of course, the order in which the elements 7, 8 and 9 are arranged in the completed coil is immaterial.

The convolutions 7, shown as being formed of copper strap, constitute an inductance coil which, at very low frequencies, or when subject to direct current, acts as a resistance element only. At normal frequencies, such as are employed in power-transmission systems, the inductance offered by the coil is relatively small. When high-frequency impulses, such as are occasioned by lightning discharges, static disturbances and the like, are impressed upon the transmission line, the inductance coil offers such impedance to them as to substantially prevent them from flowing through the coil 7.

In case the convolutions 7 are formed of a strap conductor, when high-frequency disturbances of small wave length are impressed upon the device 1, small segments of the conductor layers 7 act as condenser-plates to impart an electrostatic capacity to the coil, such condensers being connected in series around the coil. As the frequency of the disturbances decreases, larger segments of the coil act as condenser plates. As a consequence, the capacity of the protecting device is automatically varied in accordance with the frequencies of the impressed impulses. The charging current supplied to these condensers must pass through the high-resistance layers 8 and 9 which absorb the energy of the charges and dissipate the same as heat.

To more fully understand the electrical equivalent of the coil 1 when the convolutions 7 are formed of strap conductor, reference may be had to Fig. 4 in which an inductance coil 10 represents the inductance coil formed by the current-carrying convolutions 7. A resistor 12 is divided into a plurality of sections corresponding to the convolutions of the resistance layers 8 and 9. Condensers 11 are interposed between adjacent resistance sections. A resistance section and a condenser are connected in shunt to each convolution of the coil 10, the several pairs of resistance sections and condensers being connected in series relationship with one another, as shown in the figure. The condensers 11 represent, diagrammatically, the electrostatic capacity that is developed when the convolutions of the strap conductor 7 act as condenser plates under the action of high-frequency impulses. The electrostatic capacity of the condensers 11 may be varied by selecting the material comprising the layers 8. Under normal or ordinary frequencies, the elements 11 and 12 are not brought into play but, when impulses of high frequency, such as obtain in lightning disturbances, are impressed upon the protective device, the energy thereof is absorbed by the resistor 12, inasmuch as the condensers 11 afford a path of relatively low impedance to the flow of these high-frequency disturbances.

When the conducting layers 7 are formed of a relatively wide strip of copper to provide layers of relatively large area, eddy currents may be induced therein, but these may be avoided by constructing the current-carrying layers or convolutions as shown in Fig. 7. In this instance, each layer 7 comprises a plurality of relatively small diametered and side-by-side conductors 13 which are connected in parallel relationship for transmitting the power currents. Each conductor 13 may be supplied with an insulating layer or covering that will further decrease the tendency for eddy currents to develop in the current-carrying layers when subjected to high-frequency impulses. In protective devices constructed as shown in Fig. 7, the protection afforded thereby results from the condenser effect produced which directs the energy of the high-frequency impulses through the resistor 12, as shown in Fig. 4.

Of course, the material comprising the layers 8 may be so selected as to possess a low specific inductive capacity. In this event, the condensers 11 of Fig. 4 may be dispensed with and the electrical equivalent of the protective device, to all intents and purposes, may be represented diagrammatically, as shown in Fig. 9. Again, if the layers 8 are eliminated entirely, the adjacent convolutions of the coil 7 will be separated from one another by the resistance layers 9 which serve as distributed resistance elements between adjacent convolutions of the current-carrying coil. When the condensers 11 of Fig. 4 are dispensed with, the action of the protective device remains essentially the same and may be explained as follows:—

As the frequency of the impulses increases, the potentials impressed upon the coil 7 exert a greater and greater electrical pressure upon the separate convolutions of the coil. As a result, larger and larger quantities of energy are forced to flow through the resistance layers 8 and 9 between adjacent turns of the coil which serve as distributed resistance elements that absorb and dissipate the energy as heat. When the convolutions of the coil 7 are formed of copper strap of appreciable width, they likewise will dissipate some of the energy of the high-frequency impulses, since eddy currents are generated in the conductor-strap, as will be hereinafter explained.

The greater the pressure exerted by the impinging impulses, the more energy will be absorbed by the distributed resistance elements that are interposed between adjacent convolutions of the coil. As the frequency of the impulses increases, the greater will be the energy absorbed by the convolutions 7 when they are formed of copper strap. As the amplitude of the disturbances or the steepness of their wave-front increases, the more energy will be absorbed by the distributed resistance elements. Of course, the convolutions 7 may be formed of ordinary wire of small diameter, and, in this case, the eddy currents generated in the coil will be inappreciable and the energy of the impulses will, therefore, be absorbed in the distributed resistance elements interposed between adjacent convolutions of the reactance coil.

In Figs. 5 and 6 is shown a protective device having a structure similar to the device of Figs. 2 and 3 except that the high-resistance convolutions 9 are omitted. In Fig. 5, adjacent convolutions 7 are spaced from one another by the insulating convolutions 8. In this case, however, the layers 7 are intentionally made of large area in order to utilize the effect of the eddy currents produced. By subjecting the coil of Fig. 5 to high-frequency impulses, large quantities of energy may be absorbed by reason of the eddy-current losses produced in the current-carrying convolutions 7. A coil which I have constructed and subjected to test indicates that, under certain conditions, a very small amount of energy may be absorbed at normal frequencies, while large amounts of energy may be absorbed at high frequencies. To illustrate, such a coil, when subjected to a direct-current flow, will have a unity power-factor as indicated at "A" in Fig. 8. At normal frequency, such as 25 cycles, the same coil may be so designed that its power-factor will drop to a comparatively low value, as indicated at B. As the frequencies of the impulses increase, the power-factor of the coil 1 may increase to substantially the value represented at C. It will be apparent, therefore, that, at very high frequencies, the energy absorbed, as will be hereinafter explained, will be large. The phenomena, as indicated by the graph of Fig. 8, may be explained as follows:

At very low frequencies, the current-carrying convolutions 7 act as a non-inductive resistance and, therefore, the power factor of the coil will be unity. When 25 cycle energy is impressed upon the coil, the inductive reactance increases at a more rapid rate and represents a relatively larger absorption of energy than that by the eddy-currents induced in the conducting layers 7. It is assumed that the eddy-current losses are substantially in phase with $RI^2$ losses of the coil. In this instance, the power-factor of the coil decreases to a very small value. As the frequency of the electrical impulses increases, the losses due to eddy-currents, which may be represented by a reactance in phase with the $RI$ drop, increases at a substantially higher rate than the losses represented by the inductive reactance of the coil. At a frequency of 500 cycles, the eddy current losses so predominate that the losses represented by the inductive reactance of the coil are not sufficient to depress appreciably the value of the power-factor and, therefore, the power-factor of the device may approximate unity as represented at C. It will be appreciated, therefore, that, as the frequency of the impulses increases in value, the energy absorbed by my protective device, by reason of the induced eddy currents in the current-carrying convolutions of the coil, will be greatly increased and, therefore, the energy of the lightning discharges, static disturbances, etc., will be precluded from injuring other apparatus in circuit, since the energy of these impulses will be absorbed and dissipated as heat by my protective device.

While I have shown and described several embodiments of my invention, it will be understood by those skilled in the art that many modifications may be made without departing from the spirit and scope of the appended claims.

I claim as my invention:

1. A protective device comprising a current-carrying coil, a resistor having its elements disposed between adjacent convolutions of the coil, and insulating layers of high specific inductive capacity for insulating the convolutions from one another.

2. A protective device comprising a current-carrying coil having a plurality of convolutions, resistance elements of low specific electrical conductivity disposed between the coil convolutions, and insulating layers of high specific inductive capacity for insulating the coil convolutions from one another.

3. A protective device comprising a current-carrying coil having a plurality of convolutions, means for establishing a high electrostatic capacity between adjacent convolutions thereof, and layers of resistance material of low specific conductivity disposed between adjacent convolutions.

4. A protective device comprising a spirally-wound, current-carrying coil having a plurality of convolutions each providing a conducting layer of relatively large area, means for establishing high electrostatic capacity between adjacent convolutions thereof and layers of resistance material of low specific conductivity disposed between adjacent convolutions of the coil.

5. A protective device comprising a current-carrying coil having a plurality of convolutions each providing a conducting layer of relatively large width, insulating layers of high specific inductive capacity disposed between adjacent convolutions thereof, and layers of resistance material also disposed between adjacent convolutions.

6. A protective device comprising a current-carrying coil having a plurality of convolutions each consisting of side-by-side conductors to provide a layer of relatively large width, insulating layers of high specific inductive capacity disposed between adjacent convolutions thereof and other layers of resistance material of low electrical conductivity disposed between adjacent convolutions of the coil.

7. A protective device comprising alternately-disposed and spirally-wound layers of current-carrying material of high specific electrical conductivity, resistance material of low specific electrical conductivity and insulating material of high specific inductive capacity.

8. A protective device comprising a current-carrying coil having a plurality of convolutions, and relatively high-resistance elements connected in shunt to the several convolutions of the coil which serve as conducting paths between adjacent convolutions to currents that are impeded in their flow through said coil.

9. A protective device comprising a reactance coil having a plurality of convolutions, and a resistor consisting of a plurality of series-connected elements that are distributed between, and connected in shunt to, the several convolutions of said coil.

10. A protective device comprising a reactance coil having a plurality of convolutions, and a resistance material interposed between adjacent convolutions of the coil to provide a high-resistance shunt path for currents that are impeded in their flow through said coil.

11. A protective device comprising a reactance coil having a plurality of convolutions, and resistance material interposed between adjacent convolutions of the coil in order to provide energy-absorbing means for impulses that are directed therethrough by the reactance of said coil.

12. A protective device comprising a reactance coil having a plurality of convolutions, and means inserted between adjacent convolutions thereof for transforming the energy of disturbances impressed upon said coil into heat energy.

In testimony whereof, I have hereunto subscribed my name this 30th day of Dec. 1915.

RAY P. JACKSON.

Copies of this patent may be obtained for five cents each, by addressing the "Commissioner of Patents, Washington, D. C."